United States Patent
Jung et al.

(10) Patent No.: US 9,420,267 B2
(45) Date of Patent: Aug. 16, 2016

(54) DISPLAY DEVICE AND LIQUID CRYSTAL LENS PANEL DEVICE FOR THE SAME

(71) Applicant: SAMSUNG DISPLAY CO., LTD., Yongin, Gyeonggi-Do (KR)

(72) Inventors: Kyung Ho Jung, Gyeonggi-do (KR); Seon Ki Kim, Gyeonggi-do (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 31 days.

(21) Appl. No.: 14/301,786

(22) Filed: Jun. 11, 2014

(65) Prior Publication Data

US 2015/0172639 A1 Jun. 18, 2015

(30) Foreign Application Priority Data

Dec. 13, 2013 (KR) .................... 10-2013-0155784

(51) Int. Cl.
*G09G 3/36* (2006.01)
*H04N 13/04* (2006.01)
*G02F 1/1343* (2006.01)
*G02F 1/1347* (2006.01)

(52) U.S. Cl.
CPC ...... *H04N 13/0404* (2013.01); *G02F 1/134309* (2013.01); *H04N 13/0415* (2013.01); *H04N 13/0452* (2013.01); *G02F 1/1347* (2013.01)

(58) Field of Classification Search
CPC ............ G09G 3/36; G09G 3/30; H04N 9/47; G02F 1/13; G02F 1/1335; G11C 19/00
See application file for complete search history.

(56) References Cited

U.S. PATENT DOCUMENTS

| 5,493,427 A | 2/1996 | Nomura et al. |
| 8,427,626 B2 | 4/2013 | Takahashi et al. |
| 2007/0296911 A1* | 12/2007 | Hong ............... G02F 1/1313 349/200 |
| 2009/0153653 A1* | 6/2009 | Lee ............... G02F 1/13471 348/59 |
| 2011/0181827 A1* | 7/2011 | Takahashi ......... H04N 13/0404 349/200 |
| 2011/0310320 A1 | 12/2011 | Takahashi et al. |
| 2012/0008057 A1 | 1/2012 | Takahashi et al. |
| 2012/0236043 A1* | 9/2012 | Jung ............... G02B 27/2214 345/690 |
| 2012/0300042 A1* | 11/2012 | Yun ............... H04N 13/0404 348/51 |

FOREIGN PATENT DOCUMENTS

| JP | 05-284542 | 10/1993 |
| JP | 2010-060773 | 3/2010 |
| JP | 2011-154197 | 8/2011 |
| KR | 1020090060633 | 6/2009 |
| KR | 1020120068440 | 6/2012 |
| KR | 1020120088467 | 8/2012 |
| KR | 1020130027932 | 3/2013 |
| KR | 1020140102035 | 8/2014 |

* cited by examiner

*Primary Examiner* — Pegeman Karimi
(74) *Attorney, Agent, or Firm* — F. Chau & Associates, LLC

(57) ABSTRACT

A display device includes a display panel and a liquid crystal lens panel disposed on the display panel. The liquid crystal lens panel includes first and second substrates, first and second electrode layer and a liquid crystal layer interposed between the first and second electrode layers. The first and second substrates face each other. The first electrode layer is disposed on the first substrate. The first electrode layer includes first linear electrodes and second linear electrodes that extend in a first direction. The second electrode layer is disposed on the second substrate. A predetermined common voltage is applied to the second electrode layer. The first and second linear electrodes are spaced apart from each other. Driving voltages are independently applied to the first and second linear electrodes.

19 Claims, 12 Drawing Sheets

DISPLAY DEVICE AND LIQUID CRYSTAL LENS PANEL DEVICE FOR THE SAME

CROSS-REFERENCE TO RELATED APPLICATION

This application claims priority under 35 U.S.C. §119 to Korean Patent Application No. 10-2013-0155784, filed on Dec. 13, 2013 in the Korean Intellectual Property Office, the disclosure of which is incorporated by reference in its entirety.

TECHNICAL FIELD

The present invention relates to a display device and a liquid crystal lens panel device for the same.

DISCUSSION OF RELATED ART

Three-dimensional (3D) stereoscopic image display devices display a 3D image Such stereoscopic image uses an image reaching the left eye and an image reaching the right eye are displayed on the same display device, and the two images are allowed to be incident to the left eye and the right eye of an observer. That is, different images are input to both eyes, so that the observer can see the image as a stereoscopic image.

In the stereoscopic image display device using a barrier, a slit is formed at the barrier, and the image from the display device is divided into a left eye's image and a right eye's image through the slit, so that the divided images are incident to the left eye and the right eye of the observer.

In the stereoscopic image display device using a lens, a left eye's image and a right eye's image are displayed, and the image from the stereoscopic image display device is divided into the left eye's image and the right eye's image by changing an optical path by using the lens.

SUMMARY

According to an exemplary embodiment of the present invention, a display device includes a display panel and a liquid crystal lens panel disposed on the display panel. The liquid crystal lens panel includes first and second substrates, first and second electrode layer and a liquid crystal layer interposed between the first and second electrode layers. The first and second substrates face each other. The first electrode layer is disposed on the first substrate. The first electrode layer includes first linear electrodes and second linear electrodes that extend in a first direction. The second electrode layer is disposed on the second substrate. A predetermined common voltage is applied to the second electrode layer. The first and second linear electrodes are spaced apart from each other. Driving voltages are independently applied to the first and second linear electrodes.

According to an exemplary embodiment of the present invention, a liquid crystal lens panel includes a first substrate, a second substrate facing the first substrate, first and second electrode layers and a liquid crystal layer interposed between the first and second electrode layers. The first electrode layer is disposed on the first substrate and is divided into two or more regions. The second electrode layer has a single electrode overlapping the two or more regions and is disposed on the second substrate. The liquid crystal layer is interposed between the first substrate and the second substrate.

BRIEF DESCRIPTION OF THE DRAWINGS

These and other features of the present invention will become more apparent by describing in detail exemplary embodiments thereof with reference to the accompanying drawings of which.

DETAILED DESCRIPTION OF EXEMPLARY EMBODIMENTS

Figure 1:
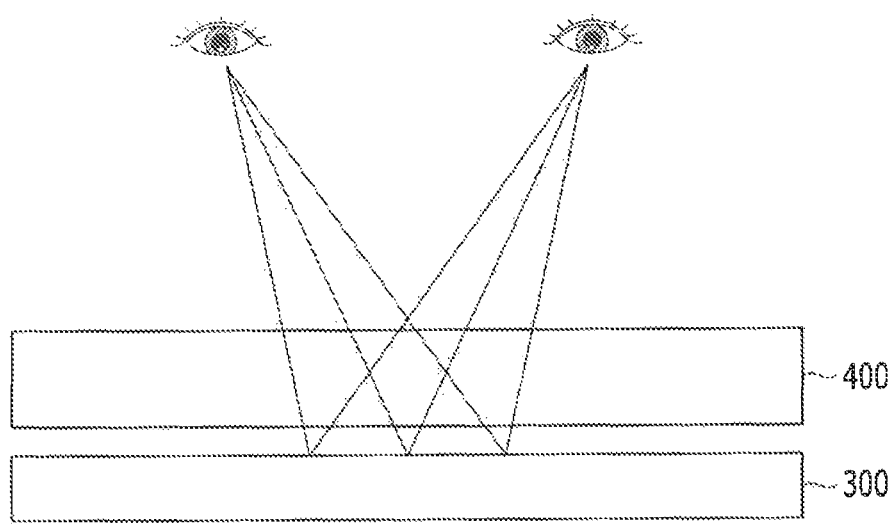
FIG. 1 is a diagram for illustrating a display device according to an exemplary embodiment of the present invention and a method for forming a two-dimensional (2D) image.

Exemplary embodiments of the present invention will be described below in detail with reference to the accompanying drawings. However, the present invention may be embodied in different forms and should not be construed as limited to the embodiments set forth herein. In the drawings, the thickness of layers and regions may be exaggerated for clarity. It will also be understood that when an element is referred to as being "on" another element or substrate, it may be directly on the other element or substrate, or intervening layers may also be present. It will also be understood that when an element is referred to as being "coupled to" or "connected to" another element, it may be directly coupled to or connected to the other element, or intervening elements may also be present. Like reference numerals may refer to the like elements throughout the specification and drawings.

Figure 2:
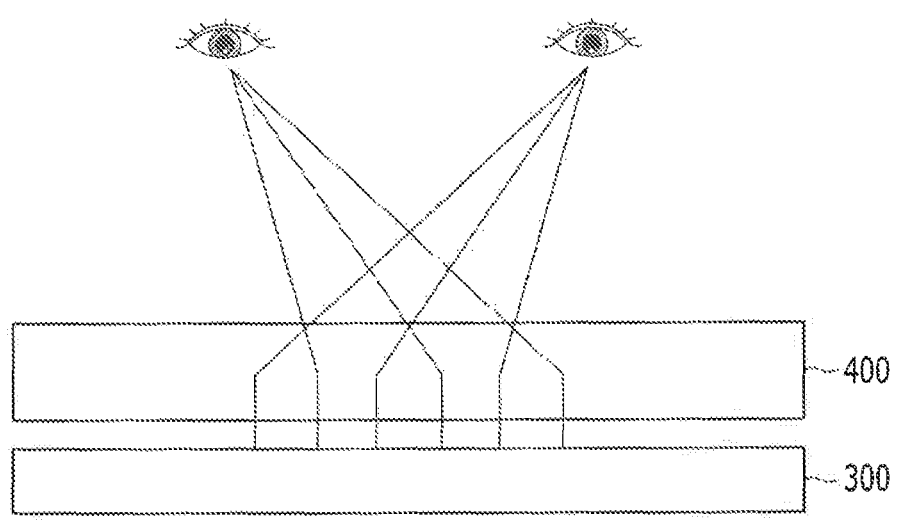
FIG. 2 is a diagram for illustrating a display device according to an exemplary embodiment of the present invention and a method for forming a three-dimensional (3D) image.

FIG. 1 is a diagram for illustrating a display device according to an exemplary embodiment of the present invention and a method for forming a two-dimensional image using the same. FIG. 2 is a diagram for illustrating a display device according to an exemplary embodiment of the present invention and a method for forming a three-dimensional image using the same.

Referring to FIGS. 1 and 2, a display device includes a display panel 300 that displays an image, and a liquid crystal lens panel 400 that is positioned in front of a surface of the display panel 300 where the image is displayed. The display panel 300 and the liquid crystal lens panel 400 may be operated in a two-dimensional (2D) mode or a three-dimensional (3D) mode.

The display panel 300 may be various types of display panels such as a plasma display device (PDP), a liquid crystal display device, and an organic light-emitting display device. The display panel 300 includes a plurality of pixels (PXs) disposed in a matrix form to display an image. The display panel 300 may display a plane image in a 2D mode and a stereoscopic image in a 3D mode. Such stereoscopic image may be formed using a space division or time division scheme. For example, in the 3D mode, the display panel 300 may alternately display the right eye's image and the left eye's image for each pixel in a column.

The liquid crystal lens panel 400 is configured to be operated in the 2D mode for allowing an image displayed on the display panel 300 to be seen as a 2D image or in the 3D mode for allowing the image to be seen as a 3D image. The liquid crystal lens panel 400 allows the image displayed on the display panel 300 to be transmitted in the 2D mode. The liquid crystal lens panel 400 divides the field of vision of the image displayed on the display panel 300 in the 3D mode. For example, the liquid crystal lens panel 400 operated in the 3D mode allows each of multiview images including a left eye's image and a right eye's image, which are displayed on the display panel 300, to be formed at the corresponding field of vision by using diffraction of light and refraction of light.

In FIG. 1, the display panel 300 and the liquid crystal lens panel 400 are operated in the 2D mode. In the 2D mode, the same image reaches the left eye and the right eye, so that the image is seen as the 2D image.

In FIG. 2, the display panel 300 and the liquid crystal lens panel 400 are operated in the 3D mode. The liquid crystal lens panel 400 divides the image on the display panel 300 into the field of vision of the left eye and the field of vision of the right eye and refracts the divided images, so that the image is seen as the 3D image.

The display panel 300 and the liquid crystal lens panel 400 are operated in the 3D mode in a partial region of a screen, and are operated in the 2D mode in the other partial region. For example, the display panel 300 may display a 3D image in the partial region and a plane image in the other partial region at the same time. The liquid crystal lens panel 400 may divide the field of vision of the image displayed in the partial region of the screen, and transmit the image displayed in the other region as it is.

Hereinafter, a structure of the liquid crystal lens panel 400 to be operated in the 3D mode will be described with reference to FIGS. 3 to 7.

Figure 3:
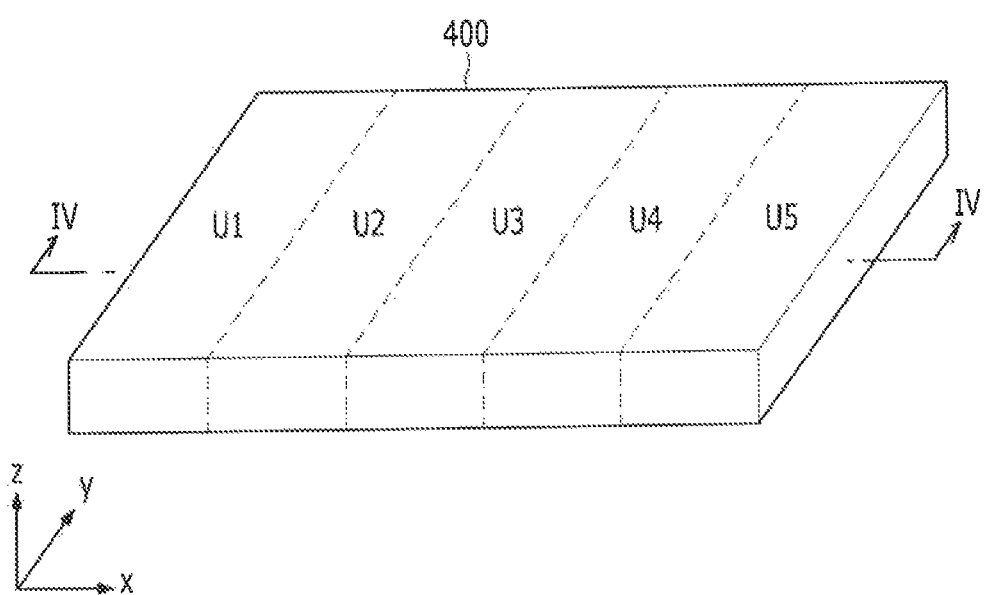
FIG. 3 is a perspective view of a liquid crystal lens panel included in the display device according to an exemplary embodiment of the present invention.
Figure 4:
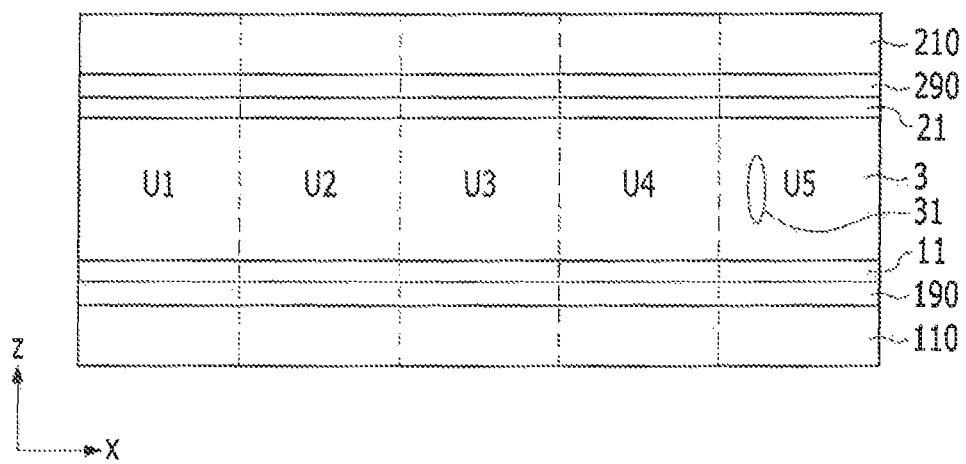
FIG. 4 is a cross-sectional view of the liquid crystal lens panel of FIG. 3 taken along line IV-IV.
Figure 5:
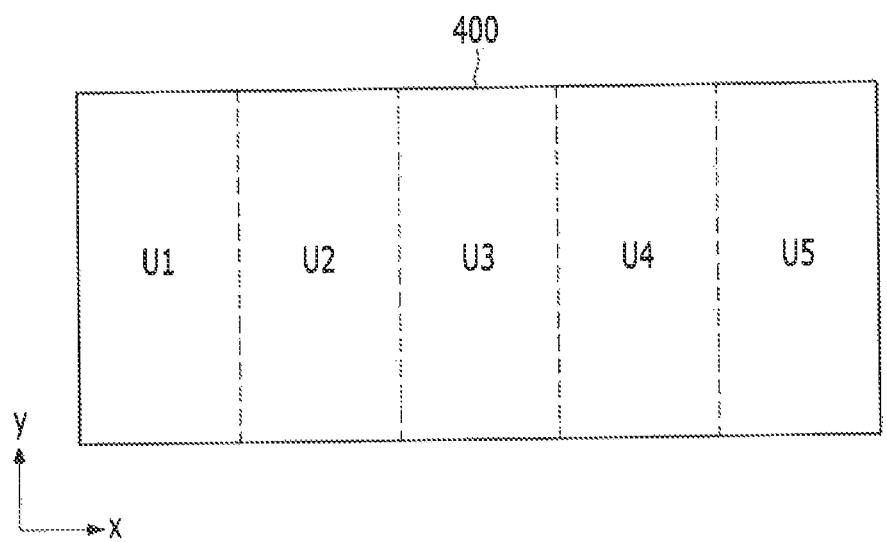
FIG. 5 is an exemplary plan view of the liquid crystal lens panel on an xy plane.

FIG. 3 is a perspective view of the liquid crystal lens panel included in the display device according to an exemplary embodiment of the present invention. FIG. 4 is a cross-sectional view of the liquid crystal lens panel in FIG. 3 taken along line IV-IV. FIG. 5 is an exemplary plan view of the liquid crystal lens panel of FIG. 3 on an xy plane.

Referring to FIGS. 3 to 5, the liquid crystal lens panel 400 includes a plurality of unit elements U1 to U5 that is sequentially positioned in an x-axis direction. One unit element covers N points of time of the display panel 300 (N is a natural number). One point of time corresponds to one pixel. For example, one unit element may cover 9 points of time. One unit element may functions as one lens.

The liquid crystal lens panel 400 includes a first substrate 110, a second substrate 210, a liquid crystal layer 3. The liquid crystal layer 3 is interposed between the two substrates 110 and 210 facing each other.

The liquid crystal lens panel 400 also includes a first electrode layer 190 and a first alignment layer 11 sequentially disposed on the first substrate 110. The liquid crystal lens panel 400 also includes a second electrode layer 290 and a second alignment layer 21 sequentially disposed on the second substrate 210. The first electrode layer 190 and the second electrode layer 290 may be made of a transparent conductive material such as an ITO (indium tin oxide) or an IZO (indium zinc oxide). The first electrode layer 190 may include a plurality of linear electrodes. The second electrode layer 290 may include a single plate-shaped electrode without any pattern. The second electrode layer 290 may cover substantially the entire surface of the second substrate 210 or may correspond to a display region of the display panel 300.

Figure 6:
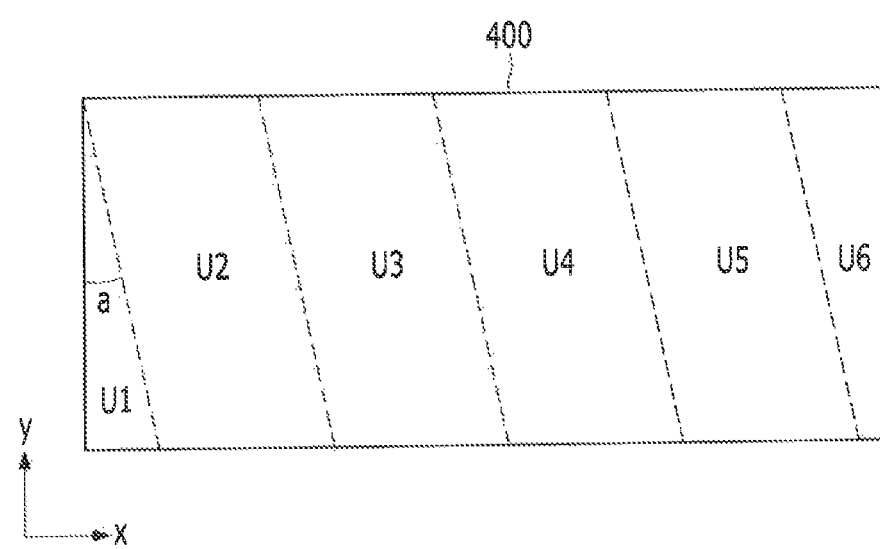
FIG. 6 is an exemplary plan view of the liquid crystal lens panel of FIG. 3 on an xy plane.

Referring to FIGS. 5 and 6, exemplary boundaries of the unit elements U1 to U5 of FIG. 3 are illustrated. In FIG. 5, the boundaries between the unit elements U1 to U5 of the liquid crystal lens panel 400 are parallel to a y-axis.

In FIG. 6, the boundaries are inclined at a predetermined angle $\theta$ with respect to y-axis. For example, the predetermined angle $\theta$ may be in a range of about 10 degrees to about 30 degrees.

Referring back to FIG. 4, an electric field is generated between the first and second electrode layers 190 and 290. Voltages applied to the first and second electrode layers 190 and 290. Such electric field is applied to the liquid crystal layer 3 to control the arrangement of liquid-crystal molecules 31 in the liquid crystal layer 3. The alignment layers 11 and 21 determine an initial alignment of the liquid-crystal molecules of the liquid crystal layer 3. The liquid crystal layer 3 may be aligned in various modes such as a horizontal alignment mode, a vertical alignment (VA) mode, and a TN (twisted nematic) mode.

The liquid crystal lens panel 400 is operated in the 2D mode or the 3D mode depending on the voltages applied to the first electrode layer 190 and the second electrode layer 290. When the voltages are not applied to the first electrode layer 190 and the second electrode layer 290, the liquid crystal lens panel 400 may be operated in the 2D mode. When the voltages are applied to the first electrode layer 190 and the second electrode layer 290, the liquid crystal lens panel 400 may be operated in the 3D mode. To achieve this, an initial alignment direction of the liquid-crystal molecule 31 may be appropriately controlled.

When the liquid crystal lens panel 400 is operated in the 3D mode, each of the unit elements U1 to U5 of the liquid crystal lens panel 400 serves as one lens. The liquid-crystal molecules 31 may be initially aligned to allow each of the unit elements U1 to U5 to serve as one lens.

Hereinafter, the liquid crystal lens panel 400 operated in the 3D mode will be described.

The plurality of unit elements U1 to U5 included in the liquid crystal lens panel 400 operated in the 3D mode may be repeatedly arranged in one direction of the liquid crystal lens panel 400 at a certain cycle. Positions of the unit elements U1 to U5 in the liquid crystal lens panel 400 may be fixed, or may be changed with time.

One unit element may be implemented as a Fresnel zone plate. The Fresnel zone plate is radially disposed to form a Fresnel zone. The Fresnel zone plate serves as a lens using a plurality of symmetric rings. As the plate becomes farther from its center, a distance between the rings becomes narrower. The zones are spaced so that the diffracted light constructively interferes at the targeted focus, creating an image there.

Figure 7:
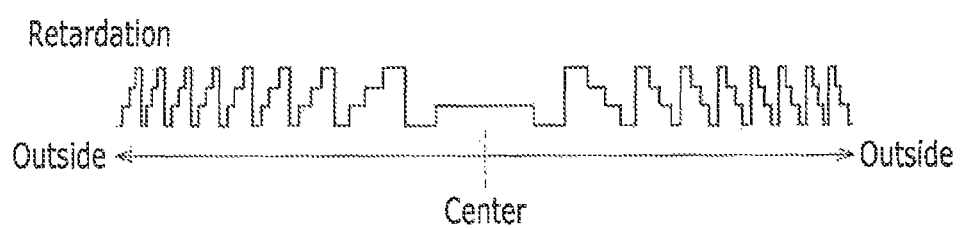
FIG. 7 is a graph illustrating a change in a retardation depending on a position of a phase modulation type Fresnel zone plate.

FIG. 7 is a graph illustrating a retardation change depending on a position of a phase modulation type Fresnel zone plate. Here, each zone of the Fresnel zone plate corresponds to each of aperiodically repeated waveforms.

Referring to FIG. 7, the retardation change in each zone occurs stepwise. For example, the retardation change in the center zone occurs over two steps, and the retardation change occurs over four steps in other zones. However, the number of steps over which the retardation is changed is not limited to the aforementioned example.

The Fresnel zone plate corresponds to a multi-level phase modulation plate, where the retardation in each zone changes stepwise. The liquid crystal lens panel 400 may diffract light to allow the light to be collected at a focal point by using diffraction and dissipation of light that is transmitted through each zone and constructive interference. As described above, a retardation distribution depending on the Fresnel zone plate is generated for each of the unit elements U1 to U5 of the liquid crystal lens panel 400, so that it is possible to exhibit a lens effect.

Hereinafter, a structure of the liquid crystal lens panel 400 that is operated in a 3D mode in a partial region of the screen and is operated in a 2D mode in the other partial region will be described.

Figure 8:
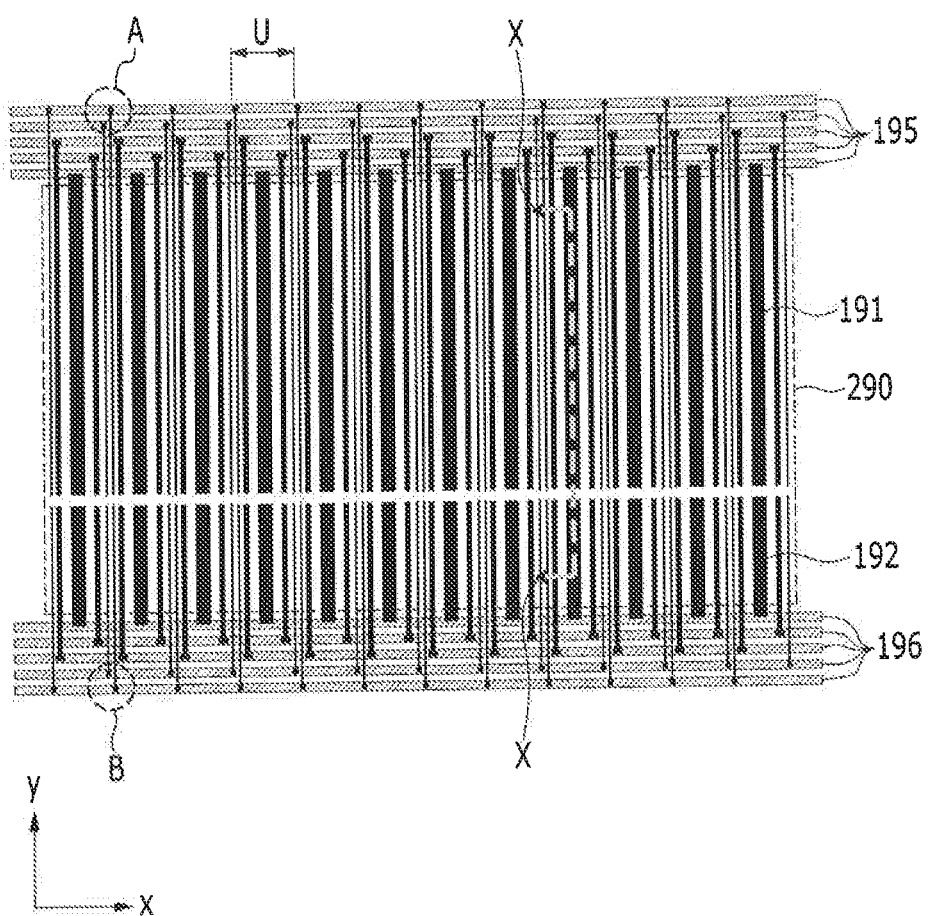
FIG. 8 is a diagram illustrating a connection configuration of electrodes in a liquid crystal lens panel according to an exemplary embodiment of the present invention.
Figure 9:
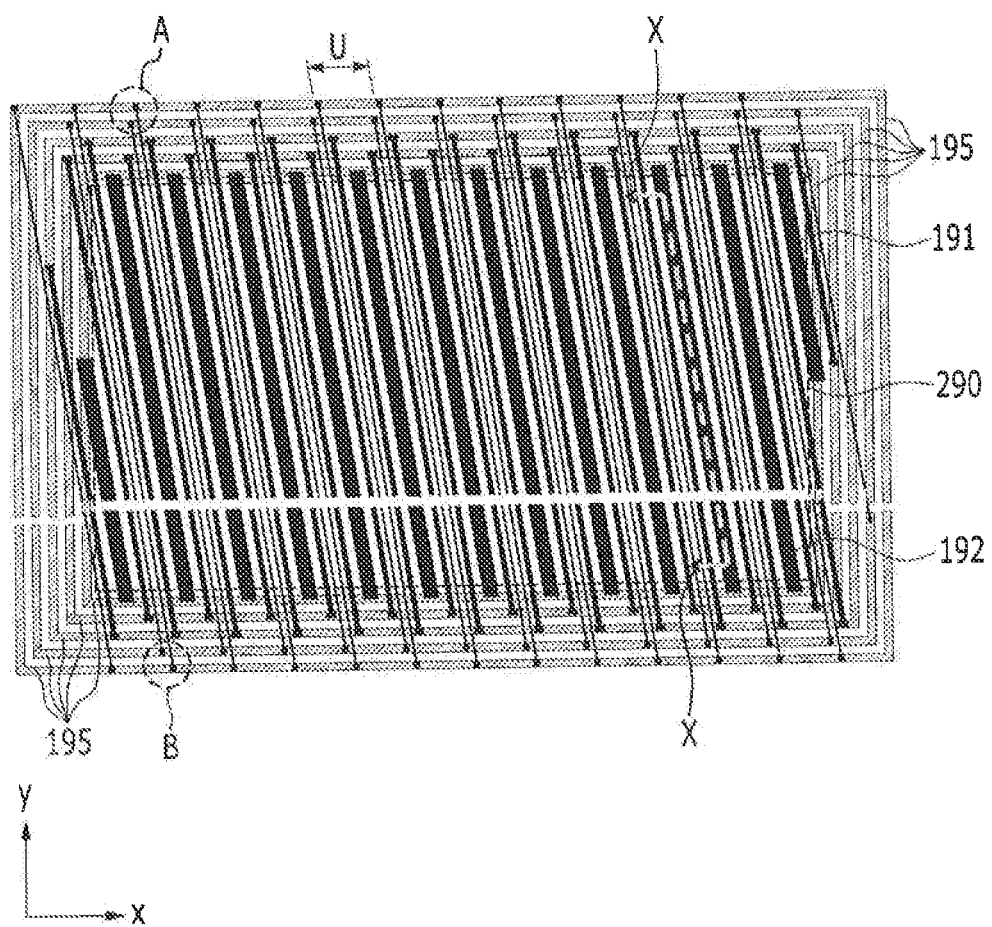
FIG. 9 is a diagram illustrating a connection configuration of electrodes in a liquid crystal lens panel according to an exemplary embodiment of the present invention.
Figure 10:
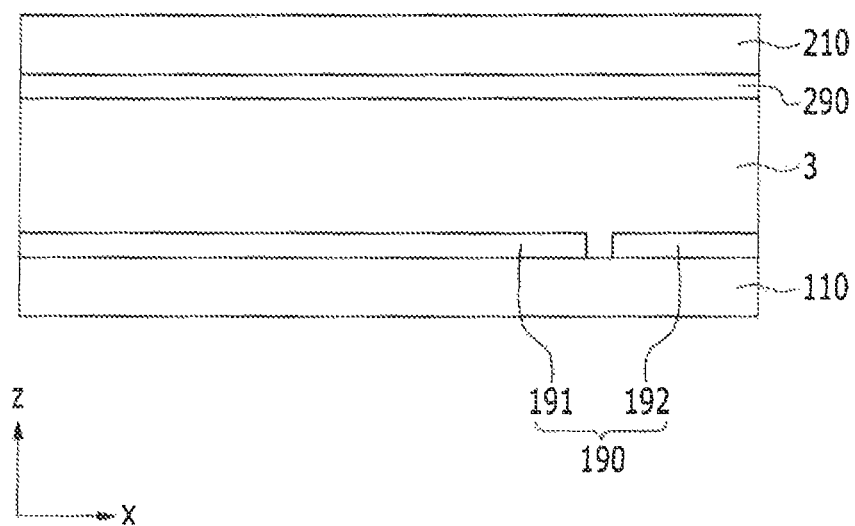
FIG. 10 is a cross-sectional view of the liquid crystal lens panel according to an exemplary embodiment of the present invention taken along line X-X of FIG. 8 or FIG. 9.
Figure 11:
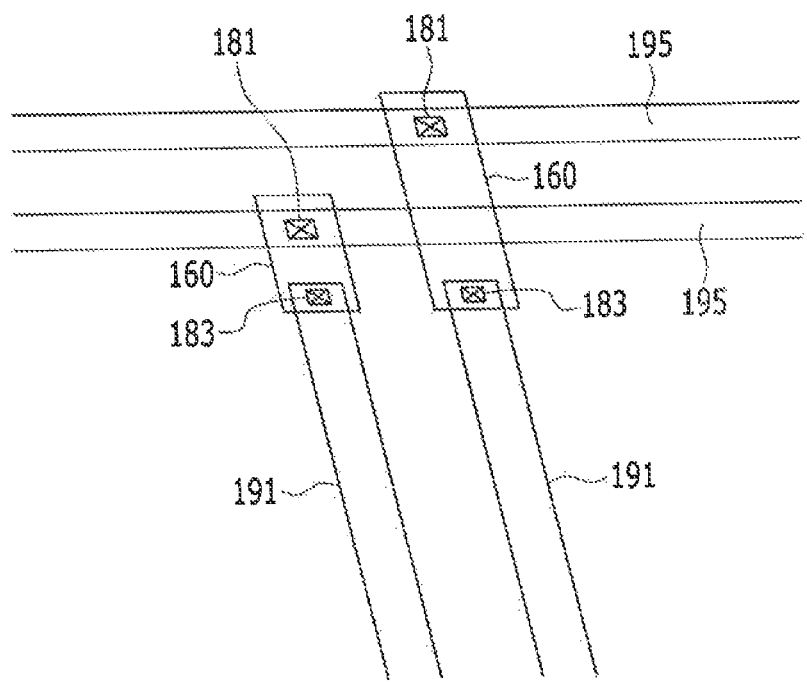
FIG. 11 is a partial enlarged view of a portion A of FIG. 9.
Figure 12:
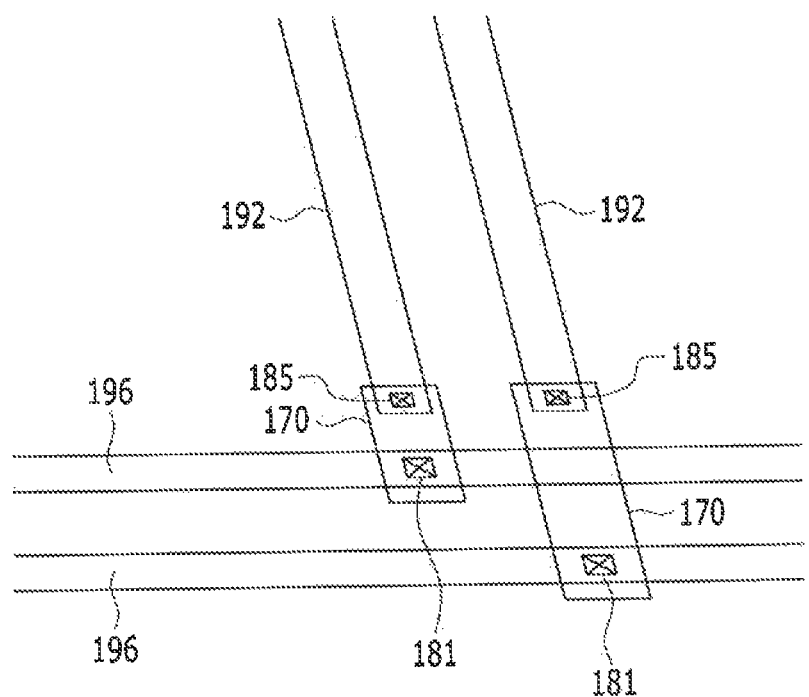
FIG. 12 is a partial enlarged view of a portion B of FIG. 9.

FIG. 8 illustrates a connection configuration of the electrodes in the liquid crystal lens panel according to an exemplary embodiment of the present invention. FIG. 9 illustrates a connection configuration of electrodes in a liquid crystal lens panel according to another exemplary embodiment of the present invention. FIG. 10 is a cross-sectional view taken along line X-X in the liquid crystal lens panel of FIG. 8 or FIG. 9 according to an exemplary embodiment of the present invention. FIG. 11 is a partial enlarged view of a portion A in FIG. 9. FIG. 12 is a partial enlarged view of a portion B in FIG. 9.

Referring to FIG. 8, a common voltage is applied to the second electrode layer 290 of the liquid crystal lens panel 400. The common voltage is a predetermined voltage. For example, the common voltage may be approximately 0 V, or may be a positive voltage or a negative voltage of a certain level. The second electrode layer 290 may be a single plate-shaped electrode, and may correspond to the display region of the display panel 300.

Referring to FIG. 8, the first electrode layer 190 includes a plurality of first linear electrodes 191 and a plurality of second linear electrodes 192 that extend in the y-axis direction. The first linear electrodes 191 and the second linear electrodes 192 may have the largest widths at a center of the unit element U, and the widths thereof may be narrowed as they are closer to edges of the unit element U. The unit first linear electrodes 191 and the second linear electrodes 192 may be symmetric with respect to the center of the element U. The plurality of first linear electrodes 191 and the plurality of second linear electrodes 192 may correspond to the display region of the display panel 300.

The respective first linear electrodes 191 and the respective second linear electrodes 192 that are disposed on the first substrate 110 are aligned in an imaginary line along a y-axis direction. As illustrated in FIG. 10, the first linear electrodes 191 and the second linear electrodes 192 are spaced apart from each other at a predetermined distance. The first linear electrodes 191 and the second linear electrodes 192 are electrically insulated. A boundary at which the plurality of first linear electrodes 191 and the plurality of second linear electrodes 192 are divided is parallel to an x-axis direction. On the contrary, the second electrode layer 290 is disposed as a single plate-shaped electrode without any divided portion. Although not illustrated in FIG. 10, the first alignment layer may be disposed on the first linear electrodes 191 and the second linear electrodes 192, and the second alignment layer 21 may be disposed on the second electrode layer 290.

Referring back to FIG. 8, a plurality of first bus lines 195 is disposed along an edge of the first substrate 110, and a plurality of second bus lines 196 is disposed along the other edge of the first substrate 110. For example, the plurality of first bus lines 195 is extended in the x-axis direction along an upper edge of the first substrate 110, and the plurality of second bus lines 196 is extended in the x-axis direction along a lower edge of the first substrate 110. The plurality of first bus lines 195 and the plurality of second bus lines 196 may be disposed on non-display regions of the display panel 300.

The plurality of first bus lines 195 and the plurality of second bus lines 196 may be electrically insulated, and driving voltages may be independently applied to the plurality of first bus lines 195 and the plurality of second bus lines 196. Different driving voltages may be applied to the first bus lines 195 and the second bus lines 196.

The plurality of first linear electrodes 191 is connected to the plurality of first bus lines 195, and the plurality of second linear electrodes 192 is connected to the plurality of second bus lines 196. First driving voltages applied to the plurality of first bus lines 195 are applied to the plurality of first linear electrodes 191, and second driving voltages applied to the plurality of second bus lines 196 are applied to the plurality of second linear electrodes 192.

The first bus lines 195 may be respectively provided at the plurality of first linear electrodes 191 included in one unit element U, and, thus, different first driving voltages may be respectively applied to the plurality of first liner electrodes 191. Furthermore, the second bus lines 196 may be respectively provided at the plurality of second linear electrodes 192 included in one unit element U, and, thus, different second driving voltages may be respectively applied to the plurality of second liner electrodes 192.

The first driving voltages may have voltage levels for forming the Fresnel LC lens with respect to the common voltage for a 3D display mode. The second driving voltages may have voltage levels substantially the same as the voltage level of the common voltage for a 2D display mode. The first driving voltages are applied to form a retardation distribution in each unit element U. The first driving voltages are applied to the plurality of first linear electrodes 191 disposed in each unit element U. When the second driving voltages have voltage levels substantially the same as the voltage level of the common voltage, the retardation distribution depending on the Fresnel zone plate is not generated in a region corresponding to the plurality of second linear electrodes 192, and the image displayed on the display panel 300 is transmitted as it is.

For example, the liquid crystal lens panel 400 includes a first region for displaying an image in a 3D mode and a second region for displaying an image in a 2D mode. The first region includes the plurality of first linear electrodes 191, and the second region includes the plurality of second linear electrodes 192. Accordingly, the 3D and 2D images are displayed at the same time on the screen.

The second driving voltages may have voltage levels for forming the Fresnel LC lens with respect to the common voltage for a 3D display mode. In such a case, the liquid crystal lens panel 400 may be operated in the 3D mode in the entire region of the screen, and the 3D image may be displayed in the entire region of the screen.

Referring to FIG. 9, the first electrode layer 190 includes a plurality of first linear electrodes 191 and a plurality of second linear electrodes 192 that are extend in an inclined direction at a predetermined angle with respect to an edge of the first substrate 110 (or the y-axis direction). A plurality of first bus lines 195 surrounds the plurality of first linear electrodes 191. The plurality of second bus lines 196 surrounds the plurality of second linear electrodes 192. The plurality of first bus lines 195 and the plurality of second bus lines 196 are electrically insulated from each other, and a boundary between the plurality of first bus lines 195 and the plurality of second bus lines 196 is substantially coincide with the boundary between the plurality of first linear electrodes 191 and the plurality of second linear electrodes 192.

The surround structure of the plurality of first bus lines 195 may allow the first liner electrode 191 disposed along the edge of the first substrate 110 and the plurality of second bus lines 196 is formed to surround the plurality of second linear electrodes 192 along the edge of the first substrate 110 is that when the plurality of first linear electrodes 191 and the plurality of second linear electrodes 192 extend in the inclined direction with respect to the y-axis by the predetermined angle, the plurality of first linear electrodes 191 and the plurality of first bus lines 195 are allowed to be connected to each other and the plurality of second linear electrodes 192 and the plurality of second bus lines 196 are allowed to be connected to each other at both left and right sides of the first substrate 110.

The configuration of FIG. 9 is substantially similar to that of FIG. 8, except that the inclined linear electrodes 191 and 192 is connected to the surrounded bus structures 195 and 196, respectively. Thus, further detailed description of FIG. 9 will be omitted here.

Referring to FIGS. 11 and 12, an insulating film (not illustrated) may be disposed on the first linear electrodes 191, the second linear electrodes 192, the first bus lines 195, and the second bus lines 196. First contact holes 181 penetrating the insulating layer may expose the first bus lines 195 and the second bus lines 196. Second contact holes 183 penetrating the insulating layer may expose the first linear electrodes 191. Third contact holes 185 penetrating the insulating layer may expose the second linear electrodes 192. First connecting electrodes 160 are disposed on the insulating layer to connect the first bus lines 195 and the first linear electrodes through the first contact holes 181 and the second contact holes 183. Second connecting electrodes 170 are formed on the insulating layer to connect the second bus lines 196 and the second linear electrodes 192 through the first contact holes 181 and the third contact holes 185.

For example, the first connecting electrodes 160 connect the first linear electrodes 191 and the first bus lines 195, and the second connecting electrodes 170 connect the second linear electrodes 192 and the second bus lines 196.

The connection structure as described above may apply to the first electrode layer 190 as shown in FIGS. 8 and 9.

Figure 13:
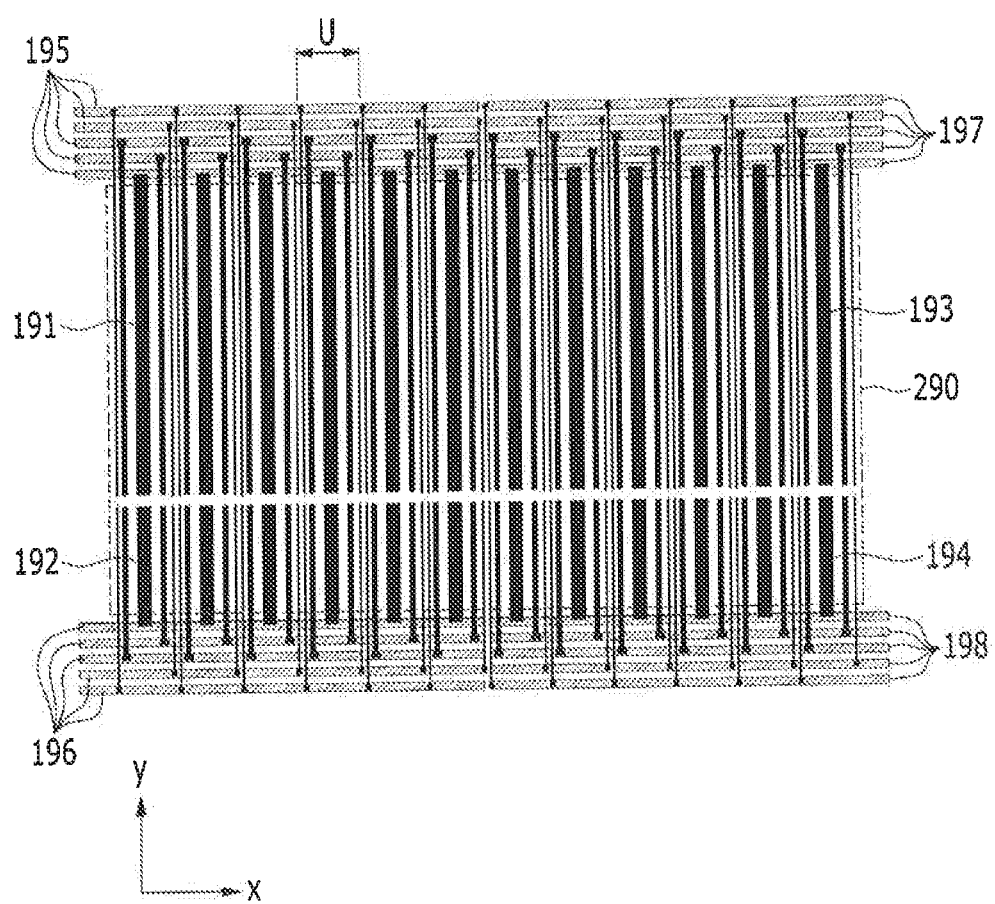
FIG. 13 is a diagram illustrating a connection configuration of electrodes in a liquid crystal lens panel according to an exemplary embodiment of the present invention.

FIG. 13 illustrates a connection configuration of electrodes in a liquid crystal lens panel according to an exemplary embodiment of the present invention.

Referring to FIG. 13, the first electrode layer 190 facing the second electrode layer 290 is divided into four portions. For example, the plurality of first linear electrodes 191, the plurality of second linear electrodes 192, a plurality of third linear electrodes 193, and a plurality of fourth linear electrodes 194, and the plurality of first bus lines 195, the plurality of second bus lines 196, a plurality of third bus lines 197, and a plurality of fourth bus lines 198 are respectively connected to the electrodes. The boundary dividing the four portions may have a cross shape. However, the present invention is not limited to the aforementioned example, and the number and area of the divided portions of the first electrode layer 190 may be varied.

The plurality of first linear electrodes 191, the plurality of second linear electrodes 192, the plurality of third linear electrodes 193, and the plurality of fourth linear electrodes 194 extend in the y-axis direction, and are spaced apart from each other at the boundary to be electrically separated from one another.

The respective first linear electrodes 191 and the respective second linear electrodes 192 that are disposed on the first substrate 110 are aligned along an imaginary line in the y-axis direction. The plurality of first linear electrodes 191 and the plurality of second linear electrodes 192 are electrically separated at a predetermined distance and are disposed on the first substrate 110. The respective third linear electrodes 193 and the respective fourth linear electrodes 194 may be aligned along an imaginary line in the y-axis direction. The plurality of third linear electrodes 193 and the plurality of fourth linear electrodes 194 are electrically separated from each other at the predetermined distance and are disposed on the first substrate 110. The boundary between the first linear electrodes 191 and the second linear electrodes may substantially coincide with the boundary between the third linear electrodes 193 and the fourth linear electrodes 194.

The plurality of first bus lines 195 is disposed along one edge of the first substrate 110, and the plurality of first linear electrodes 191 is connected to the plurality of first bus lines 195. The plurality of third bus lines 197 is disposed along one edge of the first substrate 110, and the plurality of third linear electrodes 193 is connected to the plurality of third bus lines 197. The plurality of first bus lines 195 and the plurality of second bus lines 196 are positioned in an upper side of the first substrate 110. The plurality of first bus lines 195 and the plurality of second bus lines 196 are aligned along an imaginary line in an x-axis direction. The plurality of first bus lines 195 and the plurality of third bus lines 197 are spaced apart from each other and are electrically separated from each other. The boundary between the plurality of first bus lines 195 and the plurality of second bus lines 196 may substantially coincide with the boundary between the plurality of first linear electrodes 191 and the plurality of third linear electrodes 193.

The plurality of second bus lines 196 is disposed along the other edge of the first substrate 110, and the plurality of second linear electrodes 192 is connected to the plurality of second bus lines 196. The plurality of fourth bus lines 198 is disposed along the other edge of the first substrate 110, and the plurality of fourth linear electrodes 194 is connected to the plurality of fourth bus lines 198. The plurality of second bus lines 196 and the plurality of fourth bus lines 198 are aligned along an imaginary line in the x-axis direction. The plurality of second bus lines 196 and the plurality of fourth bus lines 198 are spaced apart from each other and are electrically isolated. The boundary between the plurality of second bus lines 196 and the plurality of fourth bus lines 198 may substantially coincide with the boundary between the plurality of second linear electrodes 192 and the plurality of fourth linear electrodes 194.

Driving voltages are independently applied to the plurality of first bus lines 195, the plurality of second bus lines 196, the plurality of third bus lines 197, and the plurality of fourth bus lines 198. For example, first driving voltages are applied to the plurality of first bus lines 195, second driving voltages are applied to the plurality of second bus lines 196, third driving voltages are applied to the plurality of third bus lines 197, and fourth driving voltages are applied to the plurality of fourth bus lines 198. Each of the first to fourth voltages may have a voltage for forming a LC lens in a 3D mode or a voltage substantially similar to the common voltage in a 2D mode.

For example, it is assumed that a voltage of a level different from the common voltage is applied as the first driving voltage, and voltages of the same level as the common voltage are applied as the second to fourth driving voltages. The retardation distribution depending on the Fresnel zone plate is generated for each unit element U within the plurality of first linear electrodes. The retardation distribution depending on the Fresnel zone plate is not generated within regions in which the plurality of second to fourth linear electrodes 192, 194 and 194 are disposed, and the image displayed on the display panel 300 is transmitted as it is. For example, the liquid crystal lens panel 400 is operated in a 3D mode in a first region in which the plurality of first linear electrodes 191 is disposed. The liquid crystal lens panel 400 is operated in a 2D mode in second to fourth regions in which the plurality of second to fourth linear electrodes 192, 193 and 194 are disposed. Accordingly, the 3D image may be displayed in the first region of the screen, and the 2D image may be displayed in the second to fourth regions of the screen.

As described above, the second electrode layer 290 to which the common voltage is applied is formed as one plate-shaped electrode corresponding to the display region. The first electrode layer 190 facing the second electrode layer 290 is divided into a plurality of regions that is electrically insulated, and independently applying the driving voltages to the divided regions, it is possible to display the 3D image in the partial region of the screen and the 2D image in the other region.

What is claimed is:

1. A display device comprising:
   a display panel that displays an image; and
   a liquid crystal lens panel disposed on the display panel, wherein the liquid crystal lens panel includes:
   a first substrate and a second substrate that face each other;
   a first electrode layer disposed on the first substrate, wherein the first electrode layer includes a plurality of first linear electrodes and a plurality of second linear electrodes that extend in a first direction;
   a second electrode layer disposed on the second substrate, wherein a predetermined common voltage is applied to the second electrode layer; and
   a liquid crystal layer interposed between the first substrate and the second substrate, and
   wherein the plurality of first linear electrodes and the plurality of second linear electrodes are spaced apart from each other, and driving voltages are independently applied to the plurality of first linear electrodes and the plurality of second linear electrodes,
   wherein the plurality of first linear electrodes is supplied with the driving voltages whose voltage levels form a first portion of the liquid crystal as a lens,
   wherein the first portion of the liquid crystal is interposed between the second electrode layer and the plurality of first linear electrodes, and
   wherein the plurality of second linear electrodes is supplied with a voltage whose level is substantially the same as the predetermined common voltage.

2. The display device of claim 1, wherein the second electrode layer is formed of a single plate electrode, where the single plate electrode covers substantially the entire surface of a display region in the display panel.

3. The display device of claim 2,
   wherein the plurality of first linear electrodes and the plurality of second linear electrodes are disposed at substantially the same height from the first substrate.

4. The display device of claim 3,
   wherein the liquid crystal lens panel further includes:
   a plurality of bus lines connected to the plurality of first linear electrodes; and
   a plurality of second bus lines connected to the plurality of second linear electrodes.

5. The display device of claim 4, wherein the plurality of first bus lines and the plurality of second bus lines are disposed in an edge portion and an opposite edge portion of the first substrate, respectively, and wherein the plurality of first bus lines and the plurality of second bus lines are extended in a second direction crossing the first direction.

6. The display device of claim 5, wherein the plurality of first linear electrodes and the plurality of second linear electrodes are extended in the first direction.

7. The display device of claim 4,
   wherein the plurality of first bus lines surrounds the plurality of first linear electrodes, and the plurality of second bus lines surrounds the plurality of second linear electrodes.

8. The display device of claim 4,
   wherein driving voltages are independently applied to the plurality of first bus lines and the plurality of second bus lines.

9. The display device of claim 8, wherein the driving voltages include a voltage level substantially the same as the predetermined common voltage.

10. The display device of claim 1,
    wherein the plurality of first linear electrodes and the plurality of second linear electrodes are extended in an inclined direction at a predetermined angle with respect to an edge of the first substrate.

11. A liquid crystal lens panel comprising:
    a first substrate;
    a second substrate facing the first substrate;
    a first electrode layer disposed on the first substrate and divided into two or more separate regions;
    a second electrode layer disposed on the second substrate, wherein the second electrode layer is formed of a single plate electrode, wherein the single plate electrode overlaps substantially the entire surfaces of the two or more separate regions in the first electrode layer; and
    a liquid crystal layer interposed between the first substrate and the second substrate,
    wherein the first electrode includes:
    a plurality of first linear electrodes extending in a first direction; and
    a plurality of second linear electrodes extending in the first direction,
       wherein the plurality of first linear electrodes is supplied with the driving voltages whose voltage levels form a first portion of the liquid crystal as a lens,
       wherein the first portion of the liquid crystal is interposed between the second electrode layer and the plurality of first linear electrodes, and
       wherein the plurality of second linear electrodes is supplied with a voltage whose level is substantially the same as a predetermined common voltage.

12. The liquid crystal lens panel of claim 11,
    wherein each of the plurality of first linear electrodes and a corresponding second linear electrode of the plurality of second linear electrodes are arranged in a straight line along the first direction and spaced apart from each other.

13. The liquid crystal lens panel of claim 12, further comprising: a plurality of first bus lines and a plurality of second bus lines are extended in a second direction and disposed in an edge portion of the first substrate, wherein the plurality of first bus lines is spaced apart from the plurality of second bus lines along the second direction.

14. The liquid crystal lens panel of claim 13, wherein: a plurality of third bus lines and a plurality of fourth bus lines are extended in the second direction and disposed in an opposite edge portion of the first substrate, wherein the plurality of third bus lines is spaced apart from the plurality of fourth bus lines along the second direction.

15. The liquid crystal lens panel of claim 14, wherein the plurality of first linear electrodes and the plurality of second linear electrodes are disposed at substantially the same height from the first substrate.

16. The liquid crystal lens panel of claim 13, wherein: the plurality of first bus lines surrounds the plurality of first linear electrodes, and the plurality of second bus lines surrounds the plurality of second linear electrodes.

17. The liquid crystal lens panel of claim 12, wherein: the plurality of first linear electrodes and the plurality of second linear electrodes are disposed to extend in an inclined direction at a predetermined angle with respect to an edge of the first substrate.

18. The liquid crystal lens panel of claim 12, wherein the first electrode layer further includes: a plurality of third linear electrodes extending in the first direction; and a plurality of fourth linear electrodes extending in the first direction, wherein each of the plurality of third linear electrodes is aligned to each of the plurality of fourth linear electrodes along an imaginary line extending in the first direction, and wherein the plurality of third linear electrodes and the plurality of fourth linear electrodes are spaced apart from each other in the first direction.

19. The liquid crystal lens panel of claim 18, further comprising: a plurality of third bus lines connected to the plurality of third linear electrodes; and a plurality of fourth bus lines connected to the plurality of fourth linear electrodes, wherein the plurality of first bus lines, the plurality of second bus lines, the plurality of third bus lines, and the plurality of fourth bus lines are spaced apart from each other with a boundary having a cross shape.

* * * * *